(12) United States Patent
Rouzier

(10) Patent No.: US 11,020,642 B2
(45) Date of Patent: *Jun. 1, 2021

(54) HOCKEY STICK WITH CO-MOLDED CONSTRUCTION

(71) Applicant: Bauer Hockey, LLC, Exeter, NH (US)

(72) Inventor: Edouard Rouzier, Montreal (CA)

(73) Assignee: Bauer Hockey, LLC, Exeter, NH (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/776,357

(22) Filed: Jan. 29, 2020

(65) Prior Publication Data

US 2020/0164255 A1 May 28, 2020

Related U.S. Application Data

(62) Division of application No. 16/398,976, filed on Apr. 30, 2019, now Pat. No. 10,596,431, which is a
(Continued)

(51) Int. Cl.
| | | |
|---|---|---|
| *A63B 59/00* | (2015.01) | |
| *A63B 59/70* | (2015.01) | |
| *B29C 65/70* | (2006.01) | |
| *B29C 70/86* | (2006.01) | |
| *B29C 70/30* | (2006.01) | |
| *B29L 31/52* | (2006.01) | |
| *A63B 102/24* | (2015.01) | |
| *A63B 102/22* | (2015.01) | |
| *A63B 60/08* | (2015.01) | |

(Continued)

(52) U.S. Cl.
CPC ............ *A63B 59/70* (2015.10); *B29C 65/70* (2013.01); *B29C 70/30* (2013.01); *B29C 70/865* (2013.01); *A63B 60/08* (2015.10); *A63B 2102/22* (2015.10); *A63B 2102/24* (2015.10); *A63B 2209/02* (2013.01); *A63B 2209/023* (2013.01); *B29C 43/36* (2013.01); *B29C 70/46* (2013.01); *B29L 2031/52* (2013.01)

(58) Field of Classification Search
CPC . A63B 59/70; A63B 2102/24; A63B 2102/22; A63B 2209/023
USPC ................................ 473/562, 560, 561, 563
See application file for complete search history.

(56) References Cited

U.S. PATENT DOCUMENTS

| | | | |
|---|---|---|---|
| 1,026,181 A | 5/1912 | Seeley | |
| 1,438,030 A | 12/1922 | Hall | |

(Continued)

FOREIGN PATENT DOCUMENTS

| | | | |
|---|---|---|---|
| BE | 396392 A | 6/1933 | |
| CA | 489072 A | 12/1952 | |

(Continued)

OTHER PUBLICATIONS

Mar. 5, 2020—(CA) Office Action—App. No. 2,991,336.

*Primary Examiner* — Benjamin Layno
(74) *Attorney, Agent, or Firm* — Banner & Witcoff, Ltd.

(57) ABSTRACT

A hockey stick with a co-molded structure and method where the blade member is formed by a molding process onto a preformed shaft member, where the preformed shaft member has a contoured tip at the blade end. The contoured tip helps to secure the blade member to the shaft member in conjunction with the molded composite layers, and in one example, the contoured tip has a width that is greater than the width of the shaft member at the blade-starting region.

17 Claims, 10 Drawing Sheets

Related U.S. Application Data division of application No. 15/828,164, filed on Nov. 30, 2017, now Pat. No. 10,315,082.

(51) Int. Cl.
*B29C 70/46* (2006.01)
*B29C 43/36* (2006.01)

(56) References Cited

U.S. PATENT DOCUMENTS

| | | | |
|---|---|---|---|
| 2,023,728 A | 12/1935 | Evernden | |
| 3,533,623 A | 10/1970 | Dumont | |
| 3,934,875 A | 1/1976 | Easton et al. | |
| 4,059,269 A | 11/1977 | Tiitola | |
| 4,684,130 A | 8/1987 | Drolet et al. | |
| 5,380,005 A | 1/1995 | Hsu | |
| 5,582,406 A | 12/1996 | Babcock | |
| 5,718,647 A | 2/1998 | Tiitola | |
| 6,033,328 A | 3/2000 | Bellefleur et al. | |
| 6,062,996 A | 5/2000 | Quigley et al. | |
| 6,099,421 A * | 8/2000 | Mayhew | A63B 60/34 473/560 |
| 7,097,577 B2 | 8/2006 | Goldsmith et al. | |
| 7,232,386 B2 | 6/2007 | Halko et al. | |
| 7,520,829 B2 | 4/2009 | Mollner et al. | |
| 7,963,868 B2 | 6/2011 | McGrath et al. | |
| 9,320,952 B2 | 4/2016 | Downing et al. | |
| 9,656,137 B2 | 5/2017 | Downing et al. | |
| 10,315,082 B1 * | 6/2019 | Rouzier | B29C 70/30 |
| 2003/0004019 A1 | 1/2003 | Lussier et al. | |
| 2003/0119612 A1 | 6/2003 | Goldsmith et al. | |
| 2004/0178533 A1 | 9/2004 | Haas et al. | |
| 2004/0192468 A1 | 9/2004 | Onoda et al. | |
| 2009/0011876 A1 | 1/2009 | Mollner et al. | |
| 2009/0149284 A1 | 6/2009 | Garcia | |
| 2010/0029417 A1 | 2/2010 | Sugaya | |
| 2012/0070301 A1 | 3/2012 | Gans | |
| 2012/0178556 A1 | 7/2012 | Lussier et al. | |
| 2012/0190473 A1 | 7/2012 | Swist | |
| 2015/0038272 A1 | 2/2015 | Davis | |
| 2017/0021243 A1 * | 1/2017 | Sola | A63B 59/70 |
| 2017/0283570 A1 | 10/2017 | Kim et al. | |

FOREIGN PATENT DOCUMENTS

| | | |
|---|---|---|
| CA | 1063747 A | 10/1979 |
| CA | 2223098 A1 | 3/1998 |
| CA | 2228104 A1 | 9/1998 |
| DE | 2637228 A1 | 7/1978 |
| EP | 2801395 A1 | 11/2014 |
| FR | 2662390 A1 | 11/1991 |
| JP | S53/038430 A | 4/1978 |
| NL | 7604108 A | 10/1977 |
| RU | 2414274 C1 | 3/2011 |
| SE | 521105 C2 | 9/2003 |
| WO | 9917846 A1 | 4/1999 |
| WO | 12148262 A1 | 11/2012 |

* cited by examiner

HOCKEY STICK WITH CO-MOLDED CONSTRUCTION

CROSS-REFERENCE TO RELATED APPLICATIONS

This application is a divisional application of U.S. patent application Ser. No. 16/398,976 filed on Apr. 30, 2019, now U.S. Pat. No. 10,596,431, which is a divisional application of U.S. patent application Ser. No. 15/828,164 filed on Nov. 30, 2017 now U.S. Pat. No. 10,315,082. The above referenced applications are incorporated by reference in their entirety.

FIELD

This disclosure relates generally to fabrication of molded structures. More particularly, aspects of this disclosure relate to the construction of hockey sticks.

BACKGROUND

The fast pace at which the game of hockey is played requires players to react quickly in order to score goals, and conversely, as in the case of the defensive players, to prevent goals from being scored against. Reducing the mass of equipment, and in particular, the hockey stick, can, in certain examples, be desirable in order to move quickly to the puck and help to decrease the time it takes for a player to move his/her stick to a desired position. Aspects of this disclosure relate to improved methods for production of hockey sticks where the blade and the shaft are joined using a co-molding process.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of the disclosure herein may relate to a hockey stick apparatus, comprising a shaft member having a toe side, a heel side, a butt end and a blade end, and a blade member having a heel end, a toe end, and a striking face, where the blade member is integrally molded onto the shaft member. The blade end of the shaft member may include a contoured tip on the toe side, where the contoured tip has a maximum heel-to-toe width defined as a horizontal distance from the heel side of the shaft member to a peak of the contoured tip that is greater than a heel-to-toe width of the shaft member at a blade-starting region, where the blade-starting region can in certain instances be defined as the region on the shaft member where a plurality of prepreg layers that form the blade member onto the shaft member start on the shaft member. A ratio of the maximum heel-to-toe width of the contoured tip to the heel-to-toe width of the shaft member at a blade-starting region may be within a range of 1.125:1 to 1:175:1. The contoured tip may have a curved surface that gradually diverges outwardly from the toe side of the shaft member at the blade-starting region to the peak of the contoured tip and then decreases linearly in width from the peak to a U-shaped portion that extends around the blade end of the shaft member from the toe side to the heel side. The contoured tip may also have a substantially triangularly shaped portion and may be asymmetrical with respect to a plane centered between the heel side and the toe side of the shaft member. In addition, the contoured tip may form a substantially U-shaped portion that is surrounded by foam. The blade end of the shaft member may further define a first angle on the heel side and a second angle on the toe side, where the first angle is greater than the second angle. The length of a toe wall of the shaft member may be equal or greater than a length of a heel wall of the shaft member. Lastly, the shaft member may have a foam member that is enclosed within the shaft member adjacent a toe wall, a portion of a front wall, a portion of a rear wall, and a shaft toe sub-wall.

Other aspects of this disclosure may relate to a method of forming a hockey stick comprising: forming a shaft member by wrapping a plurality of prepreg layers around a mandrel to form a majority of the shaft member from a butt end to a blade end, where the blade end includes a contoured tip having a maximum heel-to-toe width defined as a horizontal distance from a heel side of the shaft member to a toe side of a peak of the contoured tip that is greater than a heel-to-toe width at a blade-starting region of the shaft member that is defined as the horizontal distance from the heel side of the shaft member to the toe side of the shaft member where a plurality of prepreg layers that form a blade member onto the shaft member start on the shaft member. Then, wrapping a foam core of the blade member with a composite fabric to form a blade core and assembling the blade core adjacent to the contoured tip of the shaft member. Next, wrapping a plurality of prepreg layers around the blade core and the contoured tip of the shaft member to form a hockey stick assembly. The hockey stick assembly is then placed in a mold and the mold is heated. Lastly, the hockey stick assembly is removed from the mold.

Still other aspects of this disclosure may relate to a shaft member having a contoured tip having a substantially triangular shape on the toe side of the shaft member. The contoured tip may gradually diverge outwardly towards from the toe side of the shaft member at the blade-starting region of the shaft member to a peak at a maximum width of the shaft member. The blade core may include an unwrapped neck portion that surrounds a U-shaped portion of the contoured tip of the shaft member.

Yet other aspects of this disclosure may relate to a method of forming a hockey stick comprising: forming a shaft member having a heel side, a toe side, a butt end, and a blade end, where the blade end includes a substantially triangular shaped portion along the toe side that is integrally formed with the shaft member. Then, wrapping a foam core with a composite fabric to form a blade core and assembling a blade core adjacent the blade end of the shaft member. Next, wrapping a plurality of prepreg layers around the blade core and the blade end of the shaft member to form a hockey stick assembly, and placing the hockey stick assembly in a mold. The mold may be heated, and then cooled, which allows the hockey stick assembly to be removed from the mold. The blade core may have an unwrapped neck portion that contacts a U-shaped portion of the blade end of the shaft member. Lastly, the toe side of the shaft member may have a curvilinear shape between a blade-starting region and a peak of the substantially triangular shaped portion.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different component of one single embodiment; however, the disclosed embodiments are not limited to that particular scale.

DETAILED DESCRIPTION

In the following description of various example structures, reference is made to the accompanying drawings, which form a part hereof, and in which are shown by way of illustration various embodiments in which aspects of the disclosure may be practiced. Additionally, it is to be understood that other specific arrangements of parts and structures may be utilized, and structural and functional modifications may be made without departing from the scope of the present disclosures. Also, while the terms "front", "rear", and "back" may be used in this specification to describe various example features and elements, these terms are used herein as a matter of convenience, e.g., based on the example orientations shown in the figures and/or the orientations in typical use. Nothing in this specification should be construed as requiring a specific three-dimensional or spatial orientation of structures in order to fall within the scope of this invention.

The following terms are used in this specification, and in order to help the reader's understanding, these terms have been described below. However, the purpose of these descriptions are to provide examples of the various features and concepts related to the disclosure, not to limit the scope of the invention.

"Plurality" indicates, in certain examples, any number greater than one, either disjunctively or conjunctively, as necessary, up to an infinite number.

"Integrally molded" or "Co-molded" can in certain examples be described as a one-piece member that is formed by molding a portion of the one-piece member onto a separately formed member that was formed separately prior to the molding operation, where the one-piece member has a different external shape than the original separately formed member. For instance, the one-piece member effectively becomes a single, integral piece, where separation of the one-piece member into the original separately formed members may not be accomplished without structural damage to the one-piece member.

"Prepreg" can in certain examples be described as pre-impregnated composite fibers where the composite fibers are encapsulated or suspended within an uncured polymer or epoxy matrix. The "prepreg" may be formed in sheets or layers such that they can be applied as multiple layers in differing orientations to create a structure with the desired properties. The prepreg layers when cured may create a rigid structure to a desired shape.

Aspects of this disclosure relate to systems and methods for production of a co-molded hockey stick or integrally molded hockey stick that creates a lightweight on-piece structure with uniform flex profile.

Figure 1:
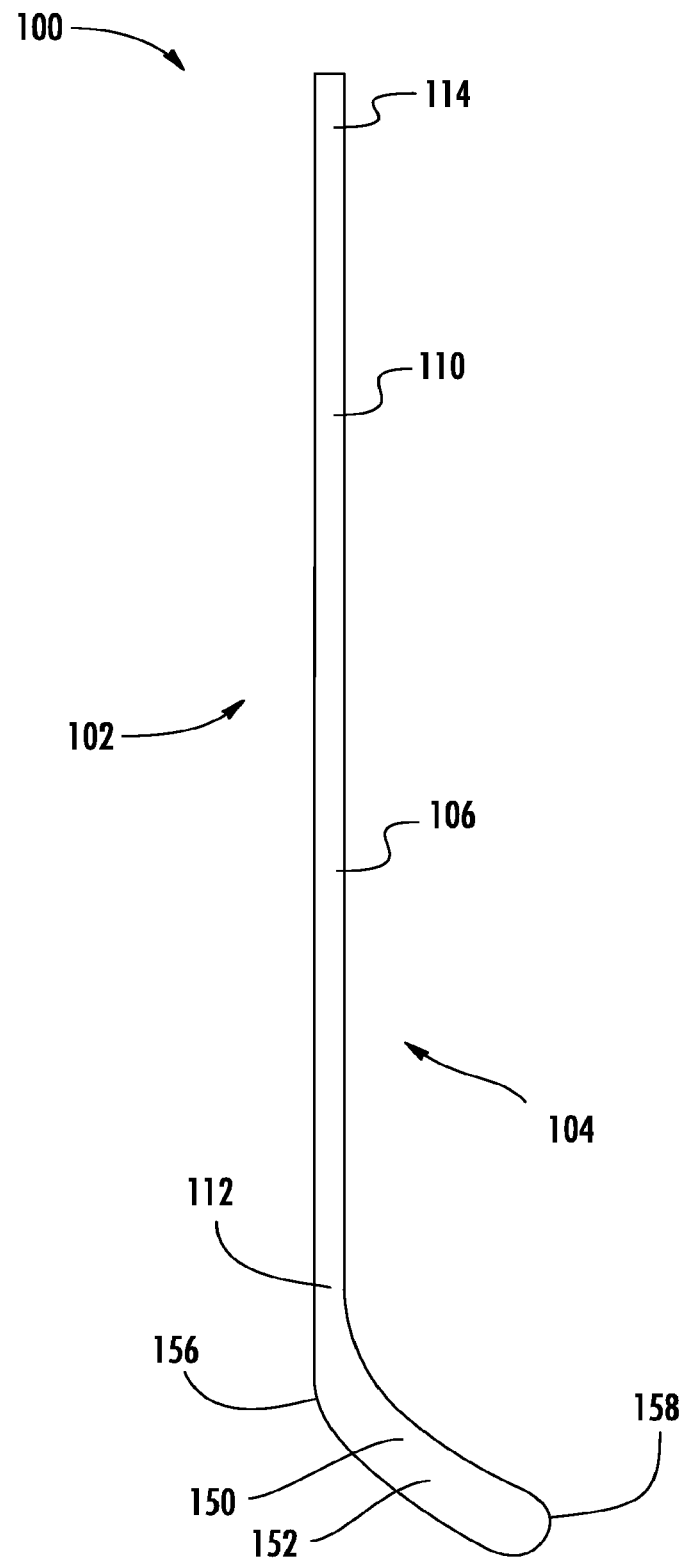
FIG. 1 illustrates a perspective view of the co-molded hockey stick according to one or more aspects described herein.

As shown in FIG. 1, the co-molded hockey stick 100 may include a heel side 102, a toe side 104, a front side 106, and a rear side. Additionally, the hockey stick 100 may include a shaft member 110 and a blade member 150, where the blade member 150 may have a striking face 152, a rear surface 154 opposite the striking face 152, a heel end 156, and toe end 158. The shaft member 110 may have a blade end 112 nearest the blade member 150 and a butt end 114 opposite the blade end 112 where the user may grip the shaft member 110. The butt end 114 of the shaft may include additional or alternative elements, such as a tacky outer surface on the butt end 114 of the shaft member 110 to provide enhanced grip for a player, and/or an end cap on the shaft member 110, without departing from the scope of these disclosures.

Figure 2:
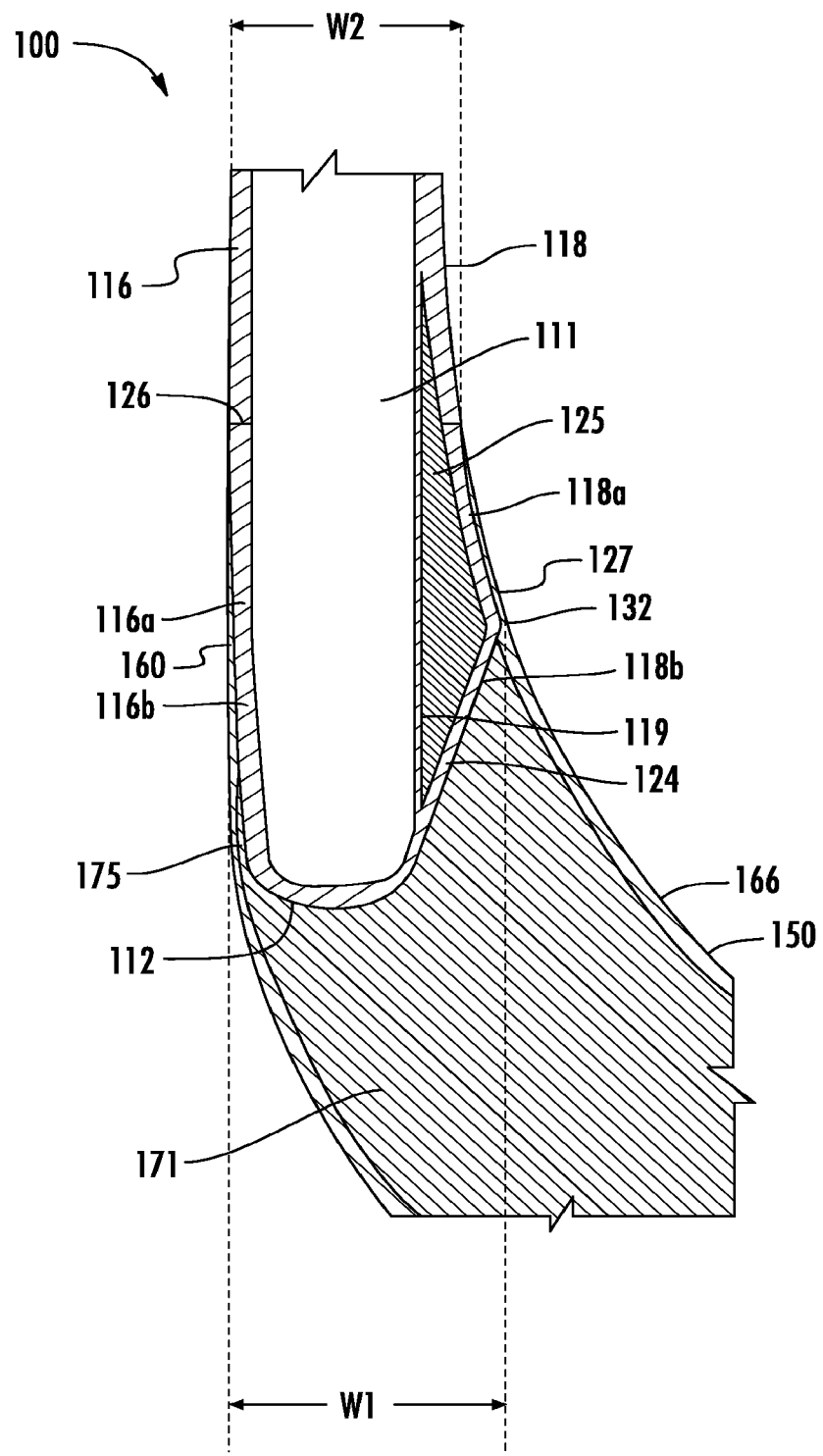
FIG. 2 illustrates a detailed view of a cross-section of the shaft member and the blade member of the co-molded hockey stick of FIG. 1 according to one or more aspects described herein.

FIG. 2 illustrates a longitudinal cross-section of the junction of the co-molded hockey stick 100 with a shaft member 110 and a blade member 150. As will be discussed in further detail below, the shaft member 110 may be molded first, and then the blade member 150 may then be molded onto the pre-molded shaft member 110 to form an integrally molded or co-molded hockey stick 100.

The shaft member 110 may have a hollow portion 111 enclosed by a heel wall 116, a toe wall 118, a front wall 120, a rear wall 122 and a contoured tip 124 formed on the blade end 112. The contoured tip 124 may have a heel-to-toe width, W1, that is greater than heel-to-toe width, W2, at the blade-starting region 126 of the shaft member 110, which may form an undercut portion 127 to further secure the shaft member 110 to the blade member 150 after the blade member 150 is formed onto the shaft member 110. This undercut portion 127 may improve the overall durability of the hockey stick 100, as the shaft member 110 is geometrically constrained by the co-molded prepreg layers forming the blade member 150, which may keep the shaft member 110 from coming loose from the blade member 150 during use. The heel-to-toe width, W1, may be defined as the horizontal distance from the exterior of the heel wall 116 to the peak 132 on the toe side of the contoured tip 124. The heel-to-toe width, W2, may be defined as the horizontal distance from the exterior of the heel wall 116 to the exterior of the toe wall 118 at the blade-starting region 126. The blade-starting region 126 can in certain instances be the region on the shaft member 110 where the prepreg layers that form the blade member 150 onto the shaft member 110 start on the shaft member 110. The blade-starting region 126 can also be a step where the shaft member 110 has a greater width between the front wall 120 and the rear wall 122 above the blade-starting region 126 compared the width between the front wall 120 and the rear wall of the shaft member 110 below the blade-starting region 126 at the contoured tip 124.

When the blade member 150 is formed onto the shaft member 110, layers of prepreg material are wrapped around the shaft member 110 up to the blade-starting region 126 of the shaft member 110. As these layers of prepreg material are cured, they form a rigid structure that secures the newly formed blade member 150 onto the shaft member 110. Additionally, since the layers of prepreg material are wrapped at a location around the contoured tip 124 and up to the blade-starting region 126, the cured prepreg layers at the blade-starting region 126 will form a rigid structure with a heel-to-toe width, W2, that is less than the heel-to-toe width, W1 to further secure the shaft member 110 to the blade member 150. This undercut portion may be defined as a ratio of W1/W2. Thus, the ratio of W1/W2 may be approximately 1.15:1, or may be within a range of 1.125:1 to 1:175:1, or may be within a range of 1.10:1 to 1.20:1.

A shaft foam member 125 having a substantially triangular shape may be arranged along the toe side of the shaft member 110 and may be enclosed by the portions of the toe wall 118a, 118b along with the shaft toe sub-wall 119. The upper end of shaft foam member 125 may be located above or below the blade-starting region 126. The shaft foam member 125 may comprise an epoxy strip, prepreg material, polyurethane foam, open cell foam, closed cell foam, expandable foam, or similar material. In addition, a heel foam member 175 or polymer filler material may be placed adjacent the portion of the heel wall 116b during the co-molding process to fill any voids when the prepreg layers are wrapped around the shaft member 110 and be enclosed by the heel wall 160 of the blade member 150. The heel foam member 175 may comprise an epoxy type material or a polymeric foam material, such as polyurethane foam, open cell foam, closed cell foam, expandable foam, or similar material. The heel foam member material may have a gel like consistency to be pliable in order to be easily shaped to the final molded shape of the blade member 150, and may also be tacky to ensure it stays in place during the installation process. Lastly, a foam core 171 may form an interior portion of the blade member 150 and may surround the U-shaped portion of the shaft member 110. The foam core 171 may comprise an epoxy material, polyurethane foam, an open or closed cell foam, or an expandable foam, or similar material.

Figure 3A:
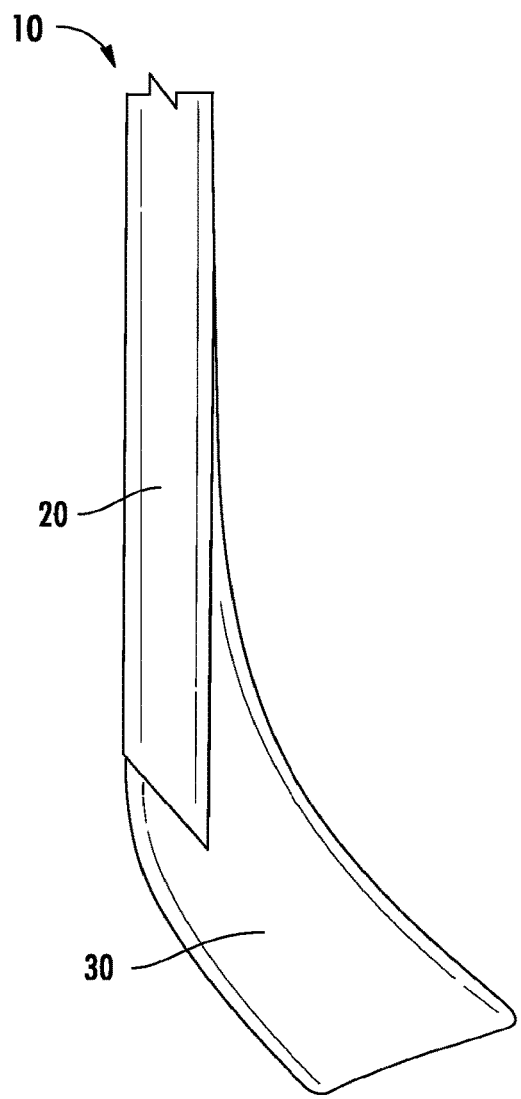
FIGS. 3A and 3B illustrates views of construction of the current hockey sticks as known to those skilled in the art.
Figure 3B:
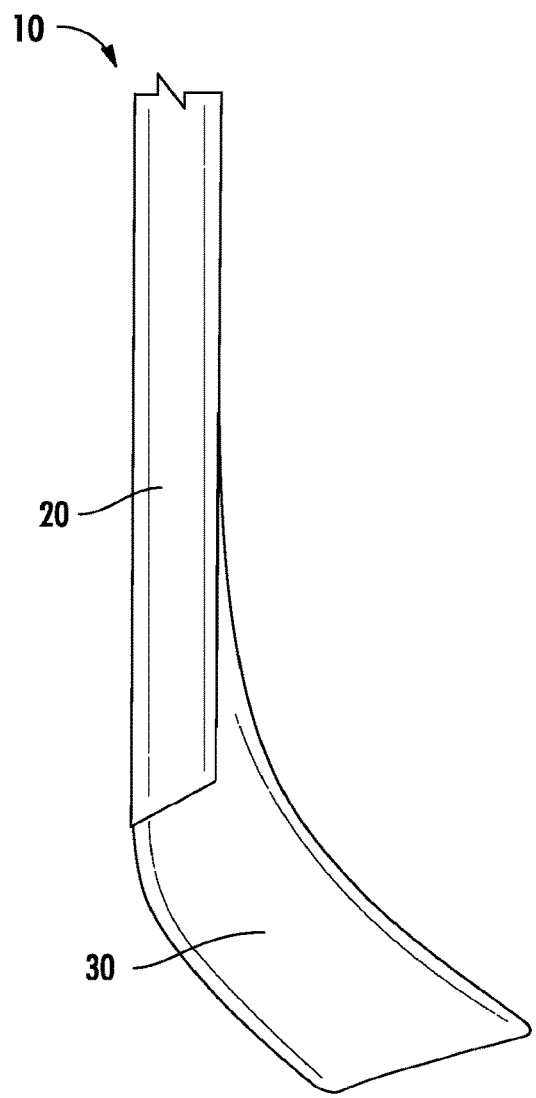

FIGS. 3A and 3B illustrate known junction configurations for co-molded hockey sticks 10 known to one skilled in the art. As shown in FIGS. 3A and 3B, the shaft members 20 are straight along the length of the toe wall and the heel wall that are molded to the blade member 30. However, with the straight shaft design, the blade member 30 may work itself loose from the shaft member 20 as only the composite layers wrapping the blade member 30 to the shaft member 20 secure the blade member to the shaft member 20. While as shown in FIG. 2, the shaft member 110 has a contoured tip 124 with an undercut portion 127 where the contoured tip 124 has a greater heel-to-toe width than the heel-to-toe width of the shaft member 110 at the blade-starting region 126. The contoured tip's greater width creates an additional feature securing the blade member 150 to the shaft member 110 as the heel-to-toe width of the blade member 150 at the blade-starting region 126 is less than the heel-to-toe width of the contoured tip 124.

Figure 4:
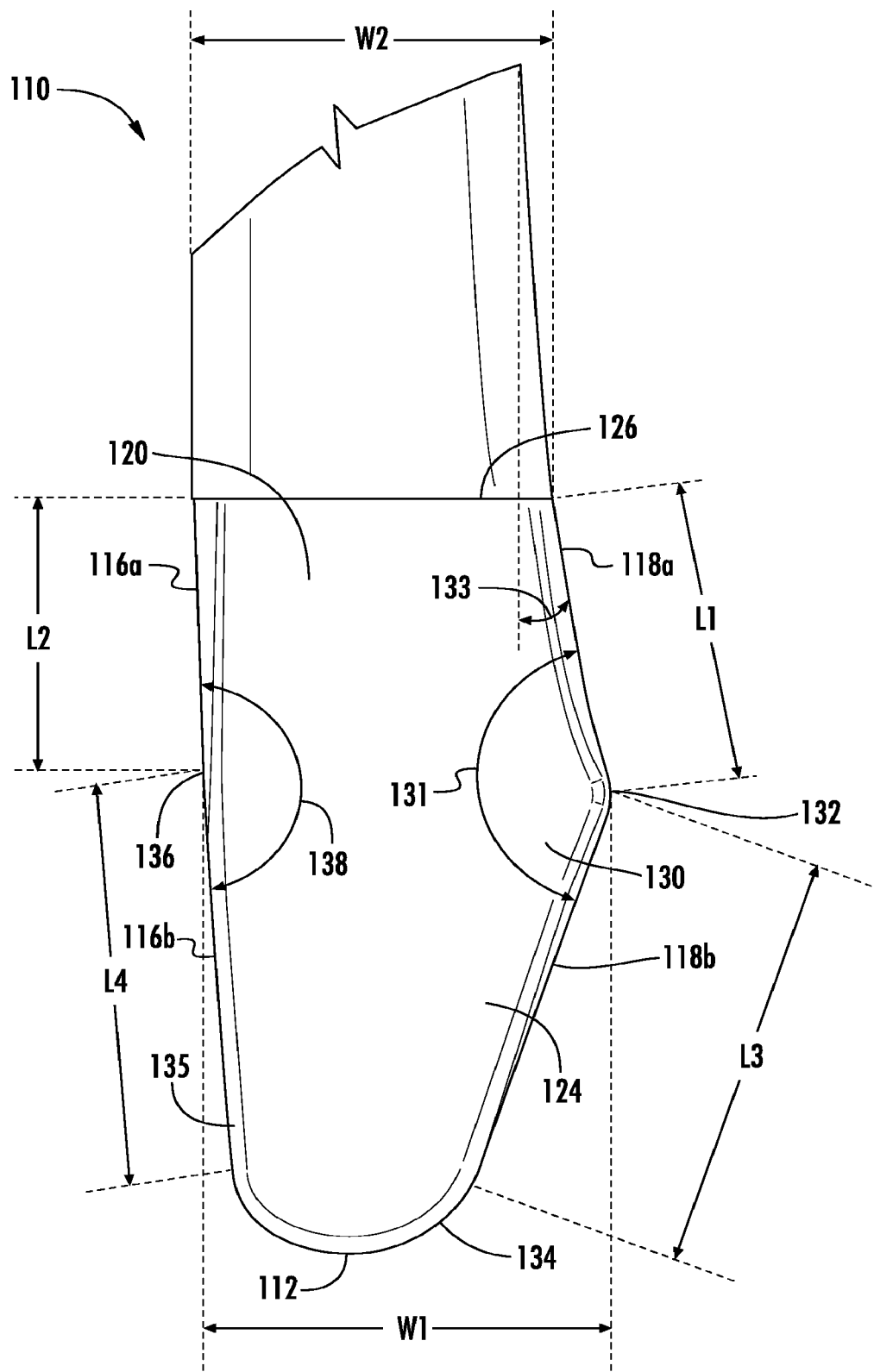
FIG. 4 illustrates a side view of a portion of the shaft member of the co-molded hockey stick as shown in FIG. 1 according to one or more aspects described herein.
Figure 5:
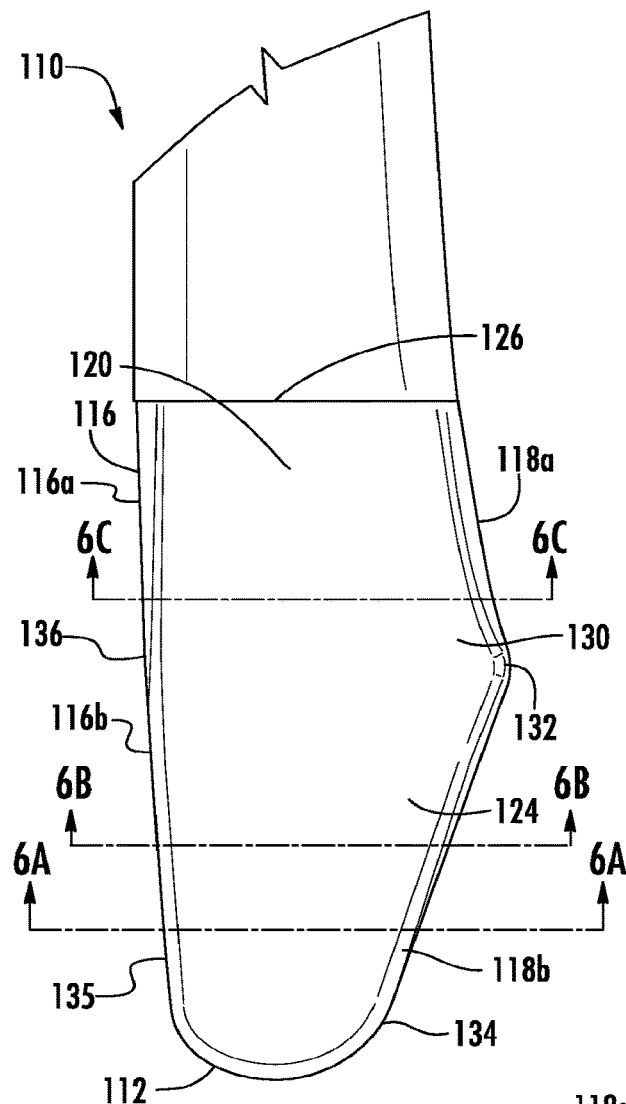
FIG. 5 illustrates a side view of a portion of the shaft member of the co-molded hockey stick as shown in FIG. 1 according to one or more aspects described herein.
Figure 6A:
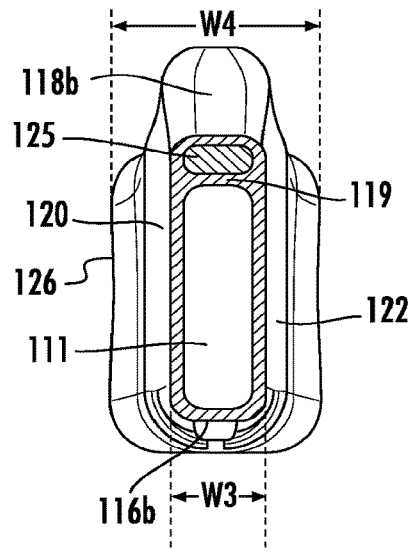
FIGS. 6A-6C illustrate cross-sectional views of the shaft member of the co-molded hockey stick as shown in FIG. 5 according to one or more aspects described herein.
Figure 6B:
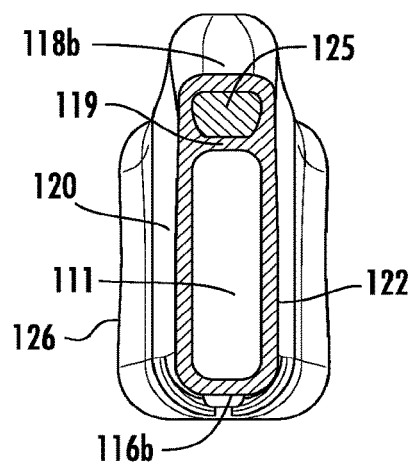
Figure 6C:
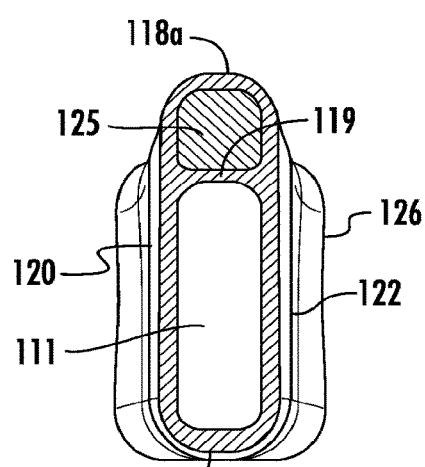
Figure 7:
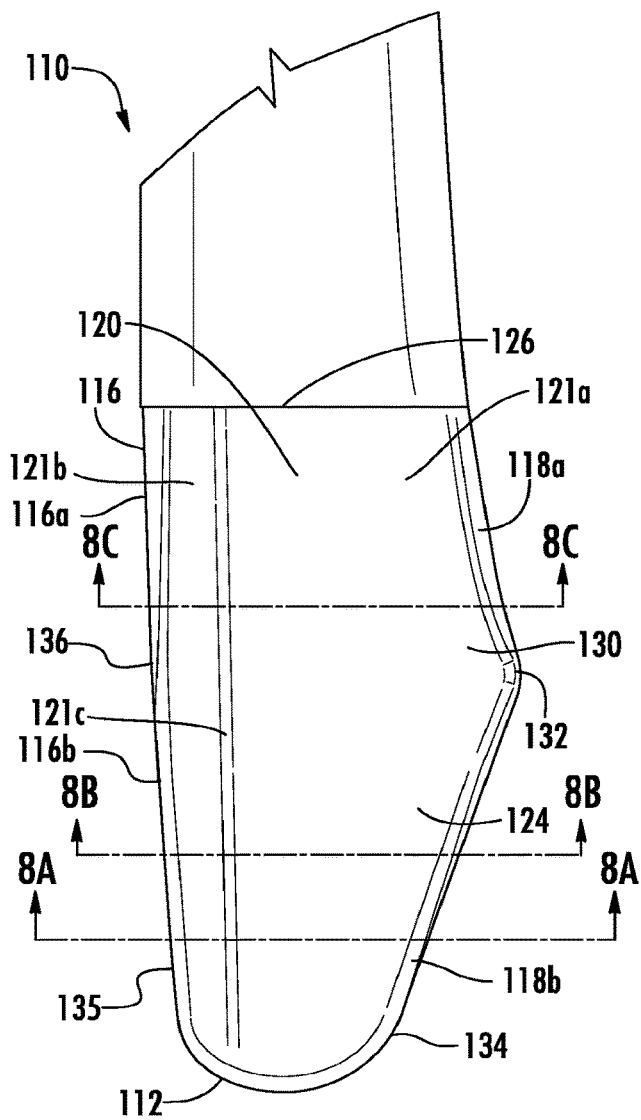
FIG. 7 illustrates a side view of an alternate embodiment of a portion of the shaft member of the co-molded hockey stick according to one or more aspects described herein.
Figure 8A:
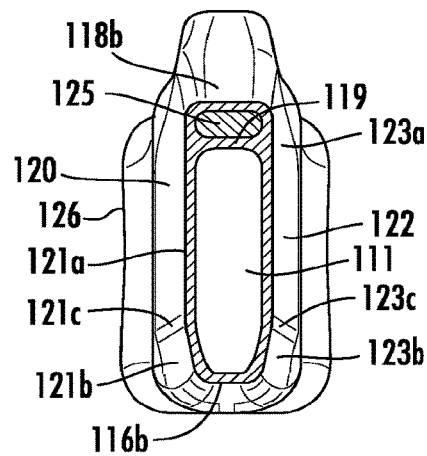
FIGS. 8A-8C illustrate cross-sectional views of the hockey stick as shown in FIG. 7 according to one or more aspects described herein.
Figure 8B:
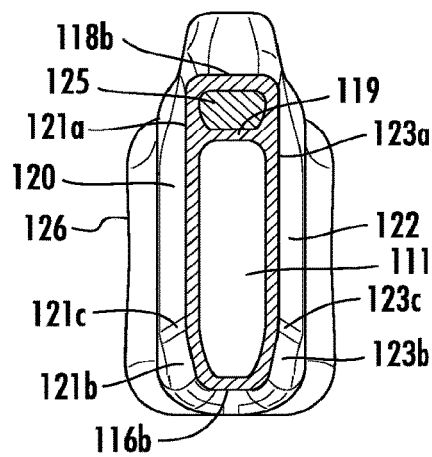
Figure 8C:
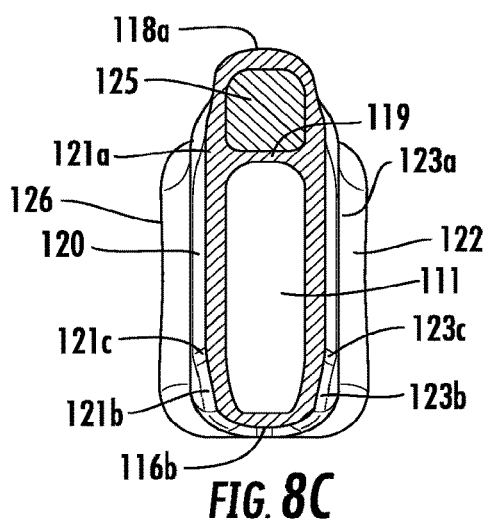

FIGS. 4 and 5 illustrate the blade end 112 portion of the shaft member 110 with an asymmetrical contoured tip 124 with respect to a plane centered between the heel wall 116 and the toe wall 118 of the shaft member 110. The contoured tip 124 may have a portion with a substantially triangular shape 130 along the toe wall 118. The substantially triangular shape may be considered either a scalene triangle, where each side has a different length. In addition, an angle 131 may be formed between the portions of the toe wall 118a, 118b. Angle 131 may be an obtuse angle, that is approximately 160 degrees, or within a range of 150 to 170 degrees, or within a range of 135 degrees to 170 degrees. The toe wall portion 118a may gradually diverge outwardly near the blade-starting region 126 as the shaft member 110 extends to its blade end 112. The toe wall portion 118a may diverge at angle 133, where angle 133 is approximately 7 degrees, or within a range of 5 degrees to 10 degrees. Toe wall portion 118a may further comprise a curved surface, while toe wall portion 118b may comprise a linear or straight surface. The contoured tip 124 may reach a maximum width, W1, at the contoured tip peak 132. From the peak 132, the contoured tip 124 may then decrease in width as the toe wall portion 118b until it reaches the blade end 112. The blade end 112 may have a substantially U-shaped portion 134 that extends around the blade end 112 from the toe wall 118 to the heel wall 116. The toe wall portion 118a between the peak 132 and the blade-starting region 126 may have a curvilinear shape to match the curvature of the upper wall 166 of the blade member 150 to create a smooth transition from the shaft member 110 to the blade member 150. The substantially triangular shape 130 may also be centered along the toe wall 118 of the shaft member 110 as shown in FIGS. 6A through 6C. As discussed above, the contoured tip 124 may have a width, W3, from the front wall 120 to the rear wall 122 that is less than the width, W4, from the front wall 120 to the rear wall 122 of the shaft member 110 above the blade-starting region 126. The contoured tip 124 may have a portion that gradually tapers from both the front wall 120 or rear wall 122 toward each other below the blade-starting region 126. The contoured tip 124 may be symmetrical about a plane centered between the front wall 120 and the rear wall 122 above the blade-starting region 126.

The heel wall portion 116a may extend below the blade-starting region 126 substantially tangential and substantially coplanar to the adjacent portion of the heel wall 116 above the blade-starting region 126 until reaching a convergence point 136. From the convergence point 136, the heel wall portion 116b may then extend at an angle 138 measured relative to heel wall portion 116a towards the toe wall portion 118b until the heel wall portion 116b reaches the substantially U-shaped portion 134 of the blade end 112. The angle 138 may be an obtuse angle and approximately 177.6 degrees, or within a range of 135 degrees and 180 degrees. In addition, angle 138 on the heel side may be greater than angle 131 on the toe side. The combination of the heel wall portion 116b and the toe wall portion 118b may form a tapered region 135. In addition, the tapered region 135 may allow for additional prepreg layers to wrap underneath the heel wall portion 116b to further secure the shaft member 110 to the blade member 150, while also allowing space for the heel foam member 175. In addition, the shaft member 110 thickness at the blade end 112 can be adjusted to accommodate more or less layers to optimize the strength of the connection between the blade member 150 and the shaft member 110.

The contoured tip 124 of the blade end 112 may be also described by comparing the length of the toe wall 118 to the heel wall 116. For example, the combined length of a first length, L1, defined as the distance of the portion of the toe wall 118a from the blade-starting region 126 to the peak 132, and a third length, L3, defined as the distance along the portion of the toe wall 118b from the peak 132 to the intersection of the toe wall portion 118b with the substantially U-shaped portion 134 where the U-shaped portion begins to curve, may be greater than or equal to the combined length of a second length, L2, defined as the distance of the portion of the heel wall 116a from the blade-starting region 126 to the convergence point 136 and a fourth length, L4, defined as the length of the portion of the heel wall 116b from the convergence point 136 to the intersection of the heel wall portion 116b with the U-shaped portion 134.

As an alternative embodiment shown in FIGS. 7 and 8A-8C, the front wall 120 and the rear wall 122 of the shaft member 110 may have a plurality of surfaces. As shown in the alternate embodiment of FIGS. 7 and 8A-8C, the front wall 120 may have a primary front surface 121a and a secondary front surface 121b. The secondary front surface 121b may be angled from the primary front surface 121a, where the secondary front surface 121b extends inward until reaching the outer surface of the heel wall 116. The primary front surface 121a may comprise a majority of the surface area of the contoured tip 124. The secondary front surface 121b may extend the majority or the entire length of the contoured tip 124 from the blade-starting region 126 to the blade end 112. The primary and secondary surfaces 121a, 121b may intersect to form an edge 121c. The edge 121c may form a linear edge or may form a curved edge. Similarly, the rear wall 122 may have a primary rear surface 123a and a secondary rear surface 123b, where the secondary rear surface 123b may be angled from the primary rear surface 123a toward the outer surface of the heel wall 116. The shaft member 110 may be symmetrical about a plane centered between the front wall 120 and the rear wall 122 above the blade-starting region 126. Thus, the primary rear surface 123a may comprise a majority of the surface area of the contoured tip 124. In addition, the secondary rear surface 123b may extend the majority or the entire length of the contoured tip 124 from the blade-starting region 126 to the blade end 112. The primary and secondary surfaces 123a, 123b may intersect to form an edge 123c. The edge 123c may form a linear edge or may form a curved edge.

Alternatively, the blade end 112 of the shaft member 110 may have a substantially straight heel wall 116 may that extends all the way to the U-shaped portion 134.

As discussed above, the shaft member 110 with its contoured tip 124 design may be formed as a separate member prior to molding the blade member 150 onto the shaft member 110 by wrapping prepreg layers around a mandrel in order to create a preformed shaft member sub-assembly before molding on the contoured tip 124. The contoured tip 124 may be formed by attaching a shaft foam member 125 to the blade end 112 of the preformed shaft member sub-assembly and then wrapping layers of prepreg material around the shaft foam member 125 to create a shaft member assembly. The shaft foam member 125 may be fully or partially wrapped with the layers of prepreg material. The shaft foam member 125 may be enclosed by the toe wall portions 118a, 118b, a portion of the front wall 120, a portion of the rear wall 122, and at least a layer of a shaft toe sub-wall 119 formed by at least one layer of prepreg that is wrapped around the mandrel when forming the shaft member sub-assembly as shown in FIGS. 6A-6C and FIGS. 8A-8C. The shaft member 110 along with the contoured tip 124 may then be formed to shape in a female-to-female type mold to create the exterior shape.

Figure 9:
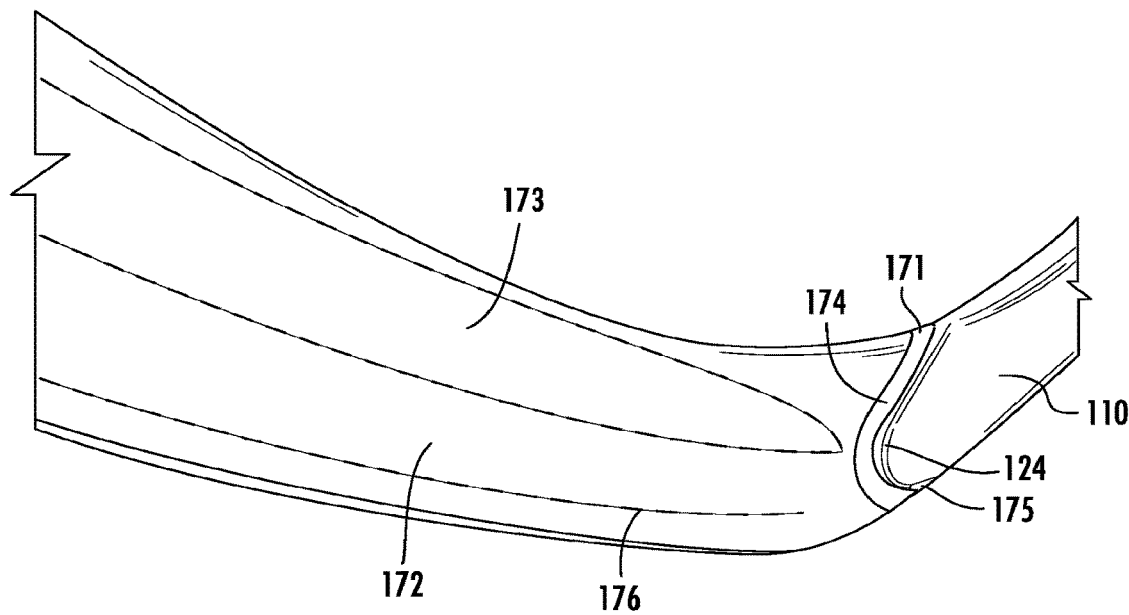
FIG. 9 illustrates a step in constructing the co-molded hockey stick according to aspects described herein.

Once the shaft member 110 with the contoured tip 124 is formed, the blade member 150 may be co-molded to the shaft member 110 to form the hockey stick 100. As shown in FIG. 9, a blade core 172, which comprise a foam core 171 with a majority of the foam core 171 wrapped in a dry composite fabric 173 or similar material, and a contoured neck portion 174 that is unwrapped, where the contoured neck portion 174 may have a portion having a shape that substantially matches U-shaped portion of the contoured tip 124 of the blade end 112 of the shaft member 110, where may be positioned adjacent the contoured tip 124 of the shaft member 110, such that the U-shaped portion of the contoured tip is surrounded by the foam of the unwrapped contoured neck portion 174. The fabric may be attached to the foam core 171 by an adhesive, stitching 176, as shown, or other means known to one skilled in the art. As discussed below, the blade member 150 may be secured to the shaft member 110 by virtue of wrapping the blade core 172 together with the shaft member 110 using a plurality of prepreg layers. However, the unwrapped contoured neck portion 174 may be secured to the shaft member 110 using an adhesive or other means known to one skilled in the art to maintain the unwrapped contoured neck portion 174 together with the shaft member 110. In addition, a heel foam member 175 or polymer filler material may be placed adjacent the heel wall portion 116b during the co-molding process to fill any voids between the heel wall portion 116b and the heel wall 160 of the blade member 150. The foam core 171 may help to provide a more solid feel to a user while also allowing some flexibility within hockey stick 100. The shape of the contoured tip 124 may further help align the blade core 172 making it easier to assemble the foam core 171 to the shaft member 110 during the co-molding process since the substantially triangular shape 130 is aligned with the longitudinal axis of the shaft member 110. The foam core 171 may have a constant thickness or may have a variable thickness.

Next, the blade core 172, the contoured tip portion 124 of the shaft member 110, and the heel foam member 175 may be wrapped in multiple prepreg layers 178 to preform the blade member 150 and form an uncured hockey stick assembly 170.

Figure 10:
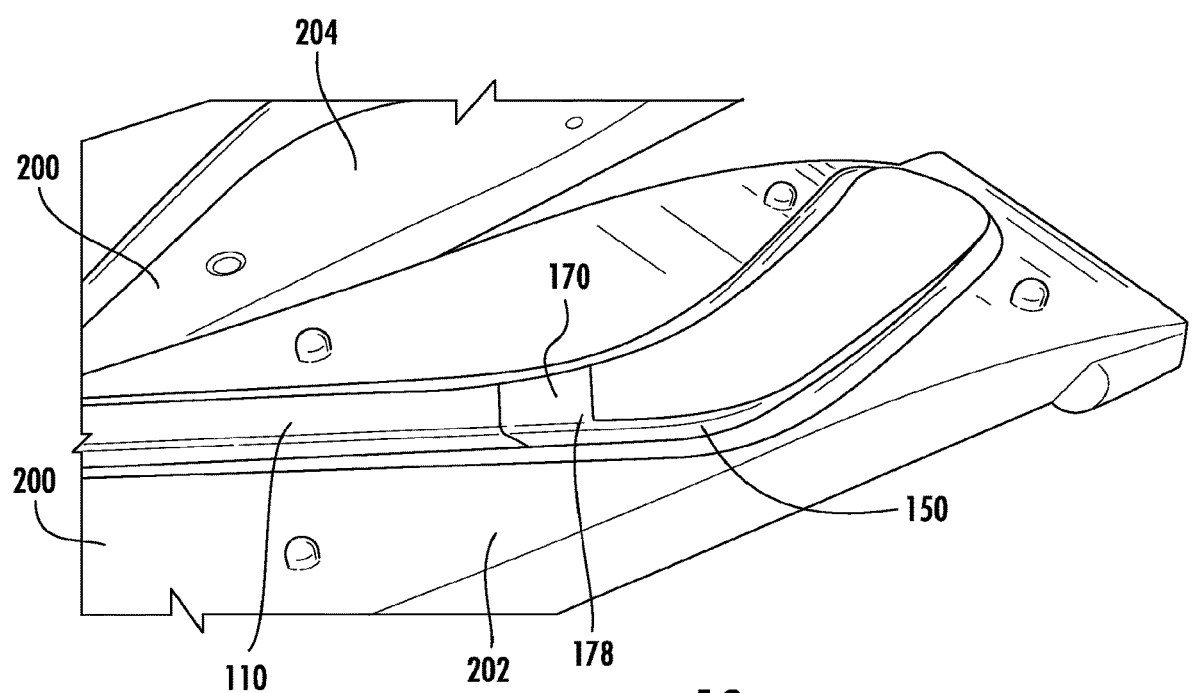
FIG. 10 illustrates a step in constructing the co-molded hockey stick according to aspects described herein.
Figure 11:
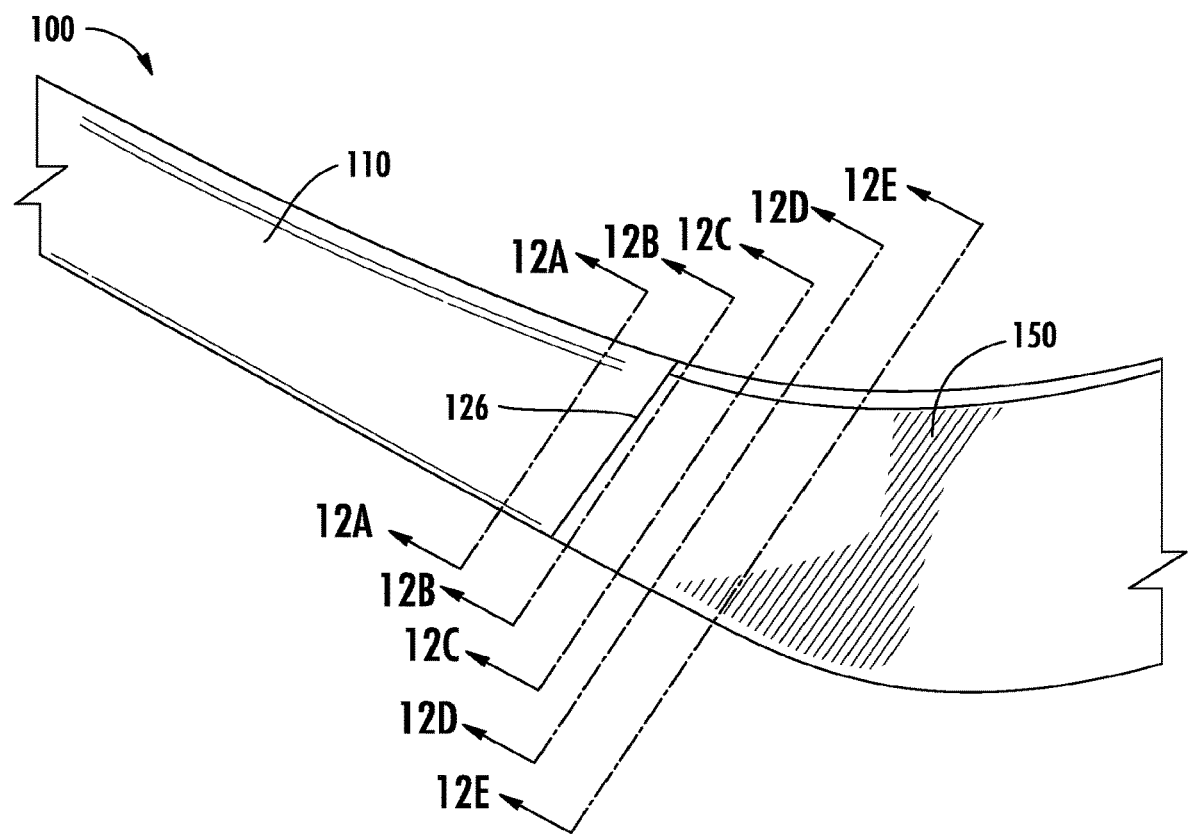
FIG. 11 illustrates a detailed view of the junction of the co-molded hockey stick according to aspects described herein.

As shown in FIG. 10, the uncured hockey stick assembly 170 is then placed into the mold structure 200 and cured by heating the mold to cure the epoxy within the prepreg to finalize the hockey stick 100. The mold structure 200 may have two halves 202 and 204 each with a specific geometry to impart the desired shape onto the hockey stick 100. For instance, the mold structure 200 used to form the geometry of the co-molded hockey stick 100 may utilize female-female, or female-male, and/or male-male mold configurations. Any heating temperature and duration may be used without departing from the scope of this disclosure. In addition, any heating technology may be used. The co-molded hockey stick 100 may be passively or actively cooled while within the mold structure 200 or after removal from the mold structure 200. Once removed from the mold, the co-molded hockey stick is formed as illustrated in FIG. 11 as a fully cured co-molded hockey stick 100.

Figure 12A:
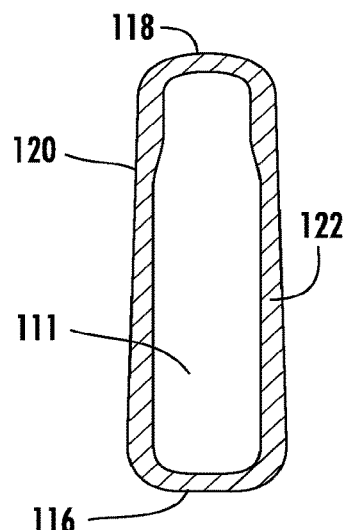
FIGS. 12A and 12E illustrate cross-sectional views of the hockey stick as shown in FIG. 11 according to aspects described herein.
Figure 12B:
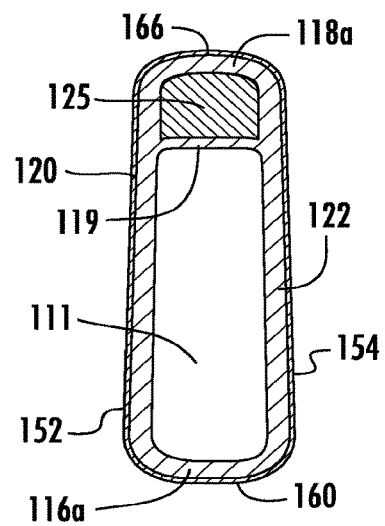
Figure 12C:
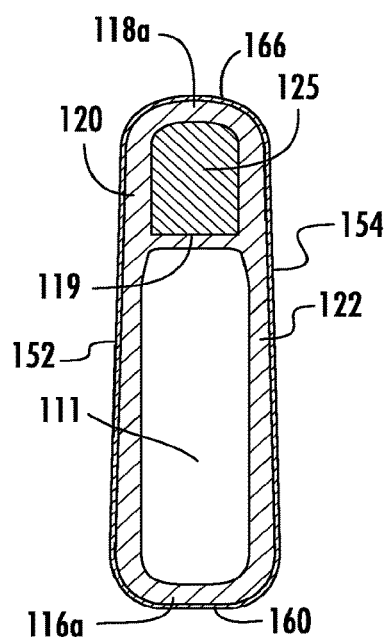

FIGS. 12A-12E depict multiple cross-sections taken through a finished co-molded hockey stick 100 to better illustrate the structure. FIG. 12A shows the heel wall 116, the toe wall 118 and the front and rear walls 120, 122 having a generally uniform thickness and hollow interior. FIGS. 12B and 12C show the heel wall portion 116a, the toe wall portion 118a, the front wall 120 and the rear wall 122 of the shaft member 110 along with a shaft foam member 125 that forms a portion of the contoured tip 124 of the shaft member 110. The shaft foam member 125 may be enclosed by the toe wall portion 118a, portions of the front and rear walls 120, 122, and the shaft toe sub-wall 119. In addition, the co-molded region forming the striking face 152, the rear surface 154, heel wall 160, and the upper wall 166 of the blade member 150 is encircling the outer surfaces of the shaft member 110.

Figure 12D:
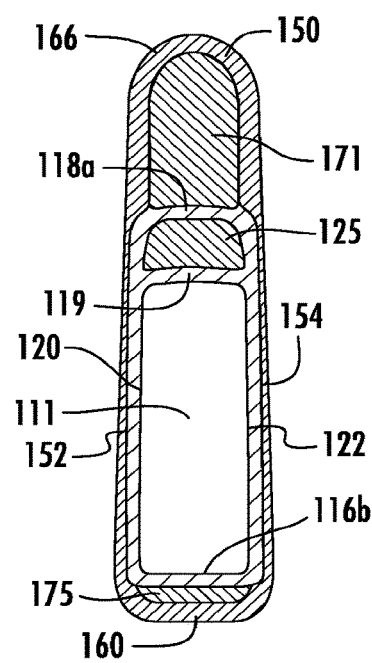
Figure 12E:
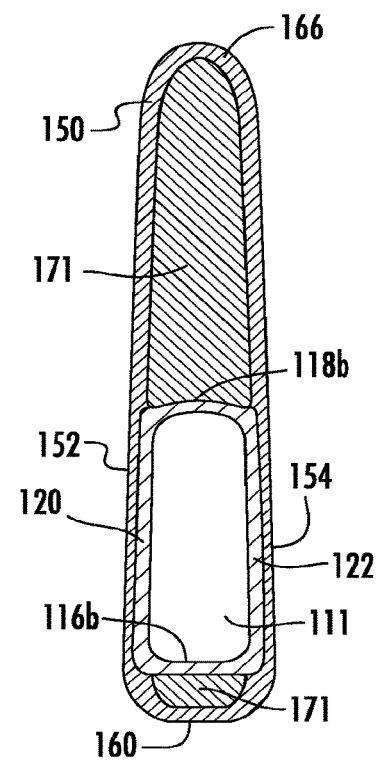

FIG. 12D shows the co-molded region of the hockey stick 100 where the blade striking face 152 is formed over the front wall 120 of the shaft member 110, the rear surface 154 is formed over the rear wall 122, and the heel wall 160 is formed over the heel foam member 175 that is adjacent the heel wall portion 116b. The toe wall portion 118b is seen adjacent the shaft foam member 125 that is enclosed by the toe wall 118a, shaft toe sub-wall 119, and the striking face 152 and rear surface 154 of the blade member 150. FIG. 12E shows a portion of the foam core 171 enclosed on the toe side by the striking face 152, the rear surface 154, the upper wall 166 of the blade member 150, and the toe wall portion 118b of the shaft member. Additionally, the heel side of the hockey stick 100 has a portion of the foam core 171 enclosed by the striking face 152, the rear surface 154, the heel wall 160 of the blade member 150 and the heel wall portion 116b of the shaft member 110.

Figure 13:
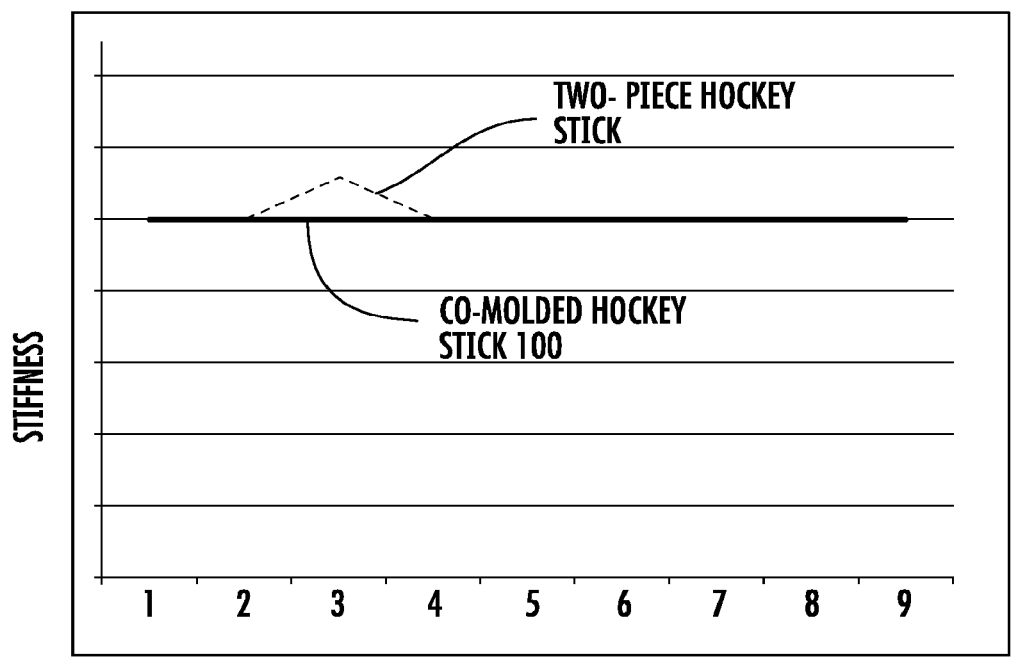
FIG. 13 illustrates a flex profile of a co-molded hockey stick compared to a traditional two-piece hockey stick construction.

The co-molded hockey stick has many advantages when compared to a two-piece hockey stick, which is made from a separately formed blade member and a separately formed shaft member joined together. In the two-piece hockey stick, the blade member has male portion called a tenon, which inserts into the end of the shaft member. This insertion adds weight at this joint as well as creating an area of increased localized stiffness compared to a co-molded hockey stick 100. Depending on the properties of the tenon, the tenon insertion into the shaft member may increase the localized stiffness up to 200% compared to the stiffness of the co-molded hockey stick 100. The co-molded hockey stick 100 may have a more uniform flex profile along the entire length of the shaft as shown in FIG. 13 compared to the two-piece hockey stick. This increase in localized stiffness may cause the hockey stick to react differently for a player or even create an unpleasant feeling when striking a puck. In addition, the co-molded hockey stick 100 as described herein also may reduce the overall weight of the hockey stick, which may make it easier to maneuver for a player, by eliminating the extra material and adhesive caused by the joint between the neck and the end of the shaft.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

I claim:

1. A hockey stick comprising:
   a shaft member comprising a toe side, a heel side, a butt end, a blade end and a midpoint generally halfway between the butt end and the blade end;
   a blade member having a heel end, a toe end, and a striking face, wherein the blade member is integrally molded onto the shaft member;
   wherein the blade end of the shaft member includes a contoured tip on the toe side, and wherein a maximum heel-to-toe width measured from the toe side to the heel side of the contoured tip is greater than a width from the toe side to the heel side at the midpoint of the shaft member; and
   wherein the contoured tip is asymmetrical with respect to a plane centered between the heel side and the toe side of the shaft member.

2. The hockey stick of claim 1, wherein the contoured tip has a curved surface that gradually diverges outwardly from the toe side of the shaft member at a blade-starting region, the blade-starting region being defined as a region on the shaft member where a plurality of prepreg layers that form the blade member onto the shaft member start on the shaft member, to a peak of the contoured tip and then decreases linearly in width from the peak to a substantially U-shaped portion that extends around the blade end of the shaft member from the toe side to the heel side.

3. The hockey stick of claim 2, wherein the U-shaped portion is surrounded by foam.

4. The hockey stick of claim 1, wherein the contoured tip has a substantially triangularly shaped portion.

5. The hockey stick of claim 1, wherein the contoured tip forms a substantially U-shaped portion.

6. The hockey stick of claim 1, wherein the blade end of the shaft member defines a first angle on the heel side and a second angle on the toe side and wherein the first angle is greater than the second angle.

7. The hockey stick of claim 1, wherein a length of a toe wall of the shaft member is equal or greater than a length of a heel wall of the shaft member.

8. The hockey stick of claim 1, wherein a ratio of the maximum heel-to-toe width of the contoured tip to a heel-to-toe width of the shaft member at a blade-starting region is within a range of 1.125:1 to 1.175:1.

9. The hockey stick of claim 1, wherein the shaft member has a foam member that is enclosed within the shaft member adjacent a toe wall, a portion of a front wall, a portion of a rear wall, and a shaft toe sub-wall.

10. A hockey stick comprising:
    a shaft member having a heel side, a toe side, a butt end, and a blade end, wherein the blade end includes a substantially triangular shaped portion extending out from the toe side that is integrally formed with the shaft member, wherein the triangular shaped portion comprises a foam member that is enclosed within the shaft member; and
    a blade member having a heel end, a toe end, and a striking face, wherein the blade member is integrally molded onto the shaft member.

11. The hockey stick of claim 10, wherein the blade end has a substantially U-shaped portion.

12. The hockey stick of claim 10, wherein the blade end of the shaft member defines a first angle on the heel side and a second angle on the toe side and wherein the first angle is greater than the second angle.

13. The hockey stick of claim 10, wherein the blade end is asymmetrical with respect to a plane centered between the heel side and the toe side of the shaft member.

14. A hockey stick comprising:
- a shaft comprising a butt-end portion, a blade-end portion, and an intermediate portion that includes a midpoint of the shaft and is disposed between the butt-end portion and the blade-end portion of the shaft, wherein the shaft is larger at the blade-end portion of the shaft than at the midpoint of the shaft; and
- a blade integrally molded with the blade-end portion of the shaft;
- wherein the shaft has a foam member that is enclosed within the shaft adjacent a toe wall, a portion of a front wall, a portion of a rear wall, and a shaft toe sub-wall.

15. The hockey stick of claim 14, wherein the hockey stick further comprises:
- a front side including a striking face of the blade,
- a rear side opposite to the front side,
- a heel side including a heel of the blade, and
- a toe side opposite to the heel side;
- wherein a width of the shaft is measured from the heel side of the hockey stick to the toe side of the hockey stick; and
- wherein the width of the shaft at the blade-end portion of the shaft is greater than the width of the shaft at the midpoint of the shaft.

16. The hockey stick of claim 15, wherein the blade-end portion of the shaft includes a substantially triangular-shaped portion extending out from the toe side.

17. The hockey stick of claim 14, wherein a ratio of a maximum heel-to-toe width of a contoured tip to a heel-to-toe width of the shaft at a blade-starting region is within a range of 1.10:1 to 1.20:1.

* * * * *